United States Patent [19]

Slaght et al.

[11] 3,792,354

[45] Feb. 12, 1974

[54] VELOCITY MEASURING SYSTEM

[75] Inventors: William Francis Slaght, Courcelette, Quebec, Canada; Julien F. Boutin, Lake Worth, Fla.

[73] Assignee: Her Majesty the Queen in right of Canada as represented by the Minister of National Defence

[22] Filed: Feb. 4, 1972

[21] Appl. No.: 223,669

[52] U.S. Cl. .................................. 324/178, 73/167
[51] Int. Cl. ............................................ G01p 3/66
[58] Field of Search .................... 324/162, 178–180; 73/167

[56] References Cited
UNITED STATES PATENTS

| | | | |
|---|---|---|---|
| 2,278,514 | 4/1942 | Florman | 324/179 |
| 2,369,659 | 2/1945 | Carr | 324/179 |
| 2,641,458 | 6/1953 | Gilvarry | 324/178 |
| 3,381,219 | 4/1968 | Dumbeck | 324/178 |

Primary Examiner—Michael J. Lynch
Attorney, Agent, or Firm—Edward J. Kelly; Herbert Berl

[57] ABSTRACT

A system and method for determining the relative velocities of a projectile at different portions of its path in which a plurality of signalling detector stations are arranged at predetermined intervals along such path, a common receiving station is arranged to receive signals from the detector stations through a common communication channel and has a memory unit capable of storing pulses corresponding to the signals received, and a calculator capable of analyzing adjacent pairs of the pulses which have been produced by passage of the projectile over two or more of the path intervals monitored by the detector stations to determine the relative velocities of the projectile as it traverses the path intervals monitored by different pairs of detector stations. This information is valuable for example in studying retardation properties of a projectile.

9 Claims, 6 Drawing Figures

VELOCITY MEASURING SYSTEM

This invention relates to a system for determining the velocity of moving objects and particularly to the measurement of the velocity of a projectile, e.g. a missile, travelling through space.

In a previous system, the velocities of a projectile as it travels along its flight path have been determined in a semi-automatic fashion by means of time-interval data supplied by a plurality of chronograph units. Each chronograph unit was independently coupled by a pair of co-axial lines to a corresponding pair of projectile detector stations. Thus, when a large number of velocity points are required, that system, whereby one chronograph unit was provided for each projectile velocity station, suffered from the disadvantage that it is uneconomical in that a relatively large number of co-axial lines had to be used.

There is a growing demand today to provide even more detector stations in order to obtain more detailed information on the retardation properties of a projectile as it travels along a flight path and is tracked by a radar, or other, system — thus the above-mentioned disadvantage is even more in evidence.

It is an object of the present invention to provide a system in which the above-mentioned disadvantage is reduced or substantially obviated Accordingly, there is provided a system for determining the relative velocities of a moving object at different portions of its path of movement, including:
  a. a number of detector stations positioned at predetermined intervals along said path and each capable of transmitting a signal when said object moves past it;
  b. a common receiving station for receiving the signals transmitted by the detector stations;
  c. a common communication channel linking said detector stations to said common receiving station;
  d. said common receiving station having a memory unit capable of storing pulses corresponding to the received signals; and
  e. calculator means capable of analyzing adjacent pairs of said pulses and determining the relative velocities of the moving object when traveling over two or more of said predetermined intervals.

More particularly, the invention provides a system for determining the relative velocities of a projectile at different portions of its flight path, including:
  a. a number of projectile detector stations located at predetermined intervals along said flight path and each capable of transmitting a signal on detection of a projectile;
  b. a common receiving station for receiving the signals transmitted by the detector stations;
  c. a common communication channel linking said detector stations to said common receiving station;
  d. said common receiving station having a memory storage unit capable of storing pulses corresponding to the received signals; and
  e. calculator means capable of analyzing adjacent pairs of said pulses and determining the relative velocities of said projectile when traveling over two or more of said predetermined intervals.

It is also an object to provide a method in which the above-mentioned disadvantage is reduced or substantially obviated.

Accordingly, there is provided a method of determining the relative velocities of a projectile at different points in its flight path including the steps of:
  a. providing a number of projectile detector stations at predetermined intervals along said flight path;
  b. causing each detector station to transmit a signal on detection of a projectile;
  c. providing a common receiving station for receiving the signals transmitted by the detector stations;
  d. providing a common communication channel linking said detector stations to said common receiving station;
  e. arranging for said common receiving station to store pulses corresponding to the received signals in a common storage unit;
  f. analyzing adjacent pairs of said pulses; and
  g. determining the relative velocities of said projectile when travelling over two or more of said predetermined intervals.

The invention will now be described by way of example with reference to the accompanying drawings in which.

It will be appreciated that the word "unit," as used herein, is not necessarily restricted to complete.

Figure 1:
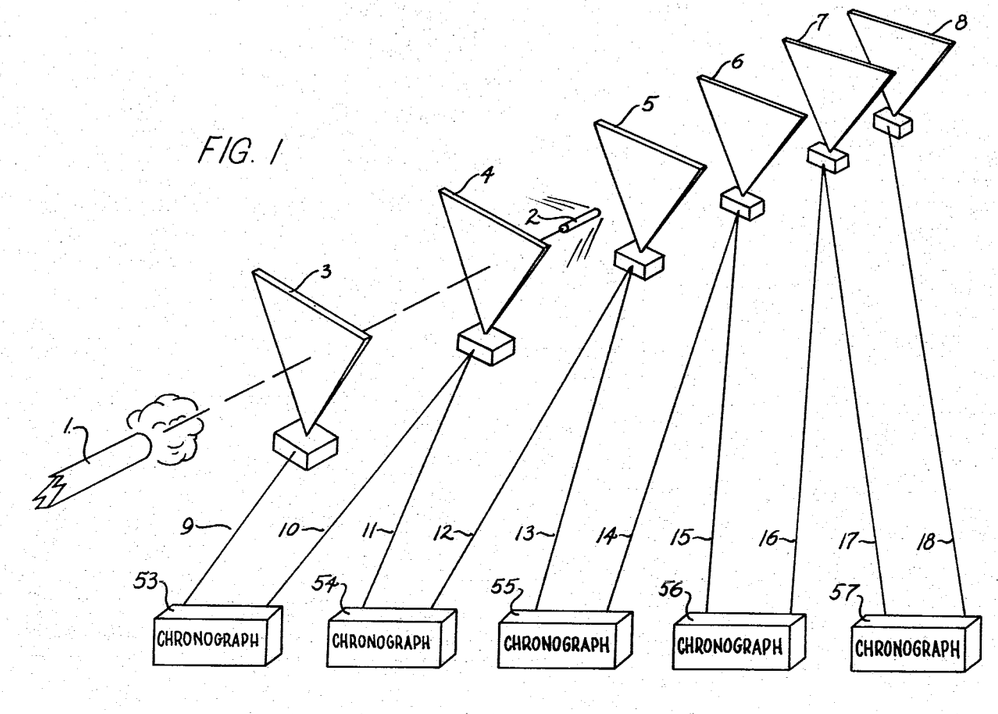
FIG. 1 is a diagrammatic representation of a known system for measuring the projectile velocities.

In FIG. 1, a known system for measuring projectile velocities is illustrated by way of a diagrammatic representation. A gun 1 is shown as just having fired a missile 2 into a measured flight path.

A plurality of projectile detector stations are identified as 3, 4, 5, 6, 7 and 8. For safety and other reasons, all the equipment is not located along the actual flight path of the missile but at some distance from the actual projectile detector stations there are located chronograph units 53, 54, 55, 56 and 57. These are connected to the projectile detector stations 3 to 8 by way of co-axial cables 9 to 18 as shown in FIG. 1. Each chronograph is connected by its respective co-axial cables to two projectile detector stations, for example chronograph unit 54 is connected through cables 11 and 12 to projectile detector stations 4 and 5. The distance between the projectile detector stations is known and, therefore, by measuring the time taken for a missile to travel between two detector stations such as 4 and 5, the chronograph unit can be used to calculate the velocity of the projectile or missile 2 between stations 4 and 5.

By determining the velocity of the projectile over a substantial length of its flight path by means of a plurality of projectile detector stations, it is possible to determine a retardation curve for the projectile's flight. There is a growing demand today for more detailed information on the retardation properties of a projectile and it will be appreciated that the accuracy of a retardation curve is directly related to the number of positions at which a velocity measurement is made along the projectile's flight path. In the system shown in FIG. 1, the various velocities are computed in a semiautomatic fashion, from the time interval data collected by the array of chronographs. Therefore, when large numbers of velocity points are required, the illustrated system of providing one chronograph unit for each velocity point becomes most uneconomical and tedious in its establishment and operation.

It will be appreciated that the projectile detector stations are accurately positioned along the projectile's flight path at known intervals and they incorporate a transducer that uses, for example, some form of electromagnetic radiation as its sensing medium. A required characteristic of this form of transducer is that it produces a useful output when a passing projectile causes a change, above a threshold level, in the electromagnetic radiation falling onto the transducer.

As mentioned above, the system shown in FIG. 1 suffers from the disadvantage that a separate chronograph unit is required for each time-interval measurement and when a large number of detector stations are required, the number of associated chronographs results in an uneconomical system and a system that, by its nature, introduces a considerable amount of work in recording and converting the resulting time intervals into average projectile velocities. A further disadvantage is the need for multi-cable runs between the detector stations and the chronographs and this is a particular disadvantage when measurements of projectile velocities are made on temporary outdoor ranges.

The embodiments of the present invention to be described obviate or substantially reduce the above-mentioned disadvantage and it may well be that all the electronic apparatus for processing the projectile velocities can be incorporated into a single unit no bigger than a television receiver console. In one construction, it was found that the electronic units less the memory occupied 0.12 cu. ft. The memory units required 3.5 cu. ft. This is achieved by providing, among other things, microwave telemeter links for receiving information from the projectile detector stations and thus eliminating the co-axial cable runs in FIG. 1. Automatic projectile velocity calculation and read-out may be provided and it will be appreciated that a large number of projectile detector stations may be provided and handled by the described embodiments of the present invention without the need for additional circuitry tests show that for a 200 ft. range and 1,000 ft./sec. minimum projectile velocity, the system can handle up to 20,000 detector stations. In the described embodiments, the co-axial cables of FIG. 1 are replaced by a common S band microwave channel wherein an S band microwave transmitter is located at each detector station. Alternatively, the signals from the projectile detector stations may be transmitted along a single video cable, e.g. with adjacent detector stations connected together by a respective length of co-axial cable whereby the co-axial cables constitute a single co-axial cable link. By the use of a memory unit, the necessity for a plurality of relatively expensive chronograph units is removed. The projectile velocity automatic data processor to be described includes a memory unit and a digital computer and it accepts on a common channel the pulse trains generated by the flight of the projectile over a number of projectile detector stations. These pulse trains are stored in the memory unit whereby the relative time spacing of individual pulses is preserved until such time as the computer section is required to analyze successive pairs of pulses and to determine the corresponding velocities of the projectile under test. Since this can be done without the necessity for personnel, who were necessary to consider the chronograph unit information in the system shown in FIG. 1, a considerable advantage is achieved. Furthermore, overall line power requirements on open ranges are reduced because storage battery operation may be achieved and continuous real time read-out of pulse information may be received from the missile range. Also, the system may obviously handle a large number of projectile detector stations without difficulty.

In a system according to the present invention for determining the relative velocities of a projectile at different points in its flight path, a plurality of projectile detector stations are provided at known intervals along the proposed flight path. Since the distance between successive projectile detector stations is known, a measurement of the time taken for a projectile to travel between successive detector stations can be measured and the velocity of the projectile can be determined by a calculation (time-interval/distance between the respective two detector stations). In a system according to the present invention, pulsed information received from the projectile detector stations is stored in a closed loop dynamic memory bank and, after a plurality of pulses have been stored in the memory, a velocity calculator scans successive pulse combinations, each corresponding to one detector station, and carries out an operation whereby the previously mentioned calculation is made to provide a "read-out" of the respective velocity.

If no second coding pulse is transmitted then, obviously each successive pair of pulses corresponds to two dector stations — two detector stations then making up one velocity station.

Figures 2A, 2C:
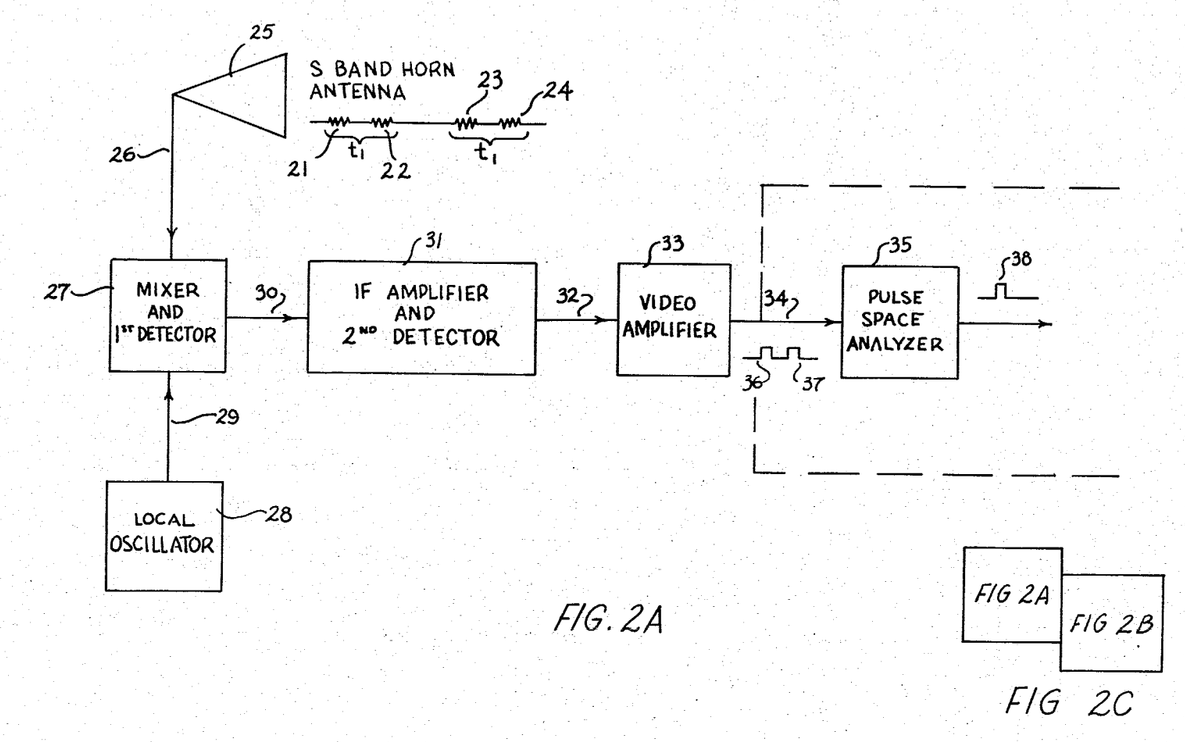
FIG. 2 is a diagrammatic representation of a system according to the present invention for use in determining the relative velocities of a projectile and comprises FIGS. 2A and B arranged as FIG. 2C.
Figure 2B:
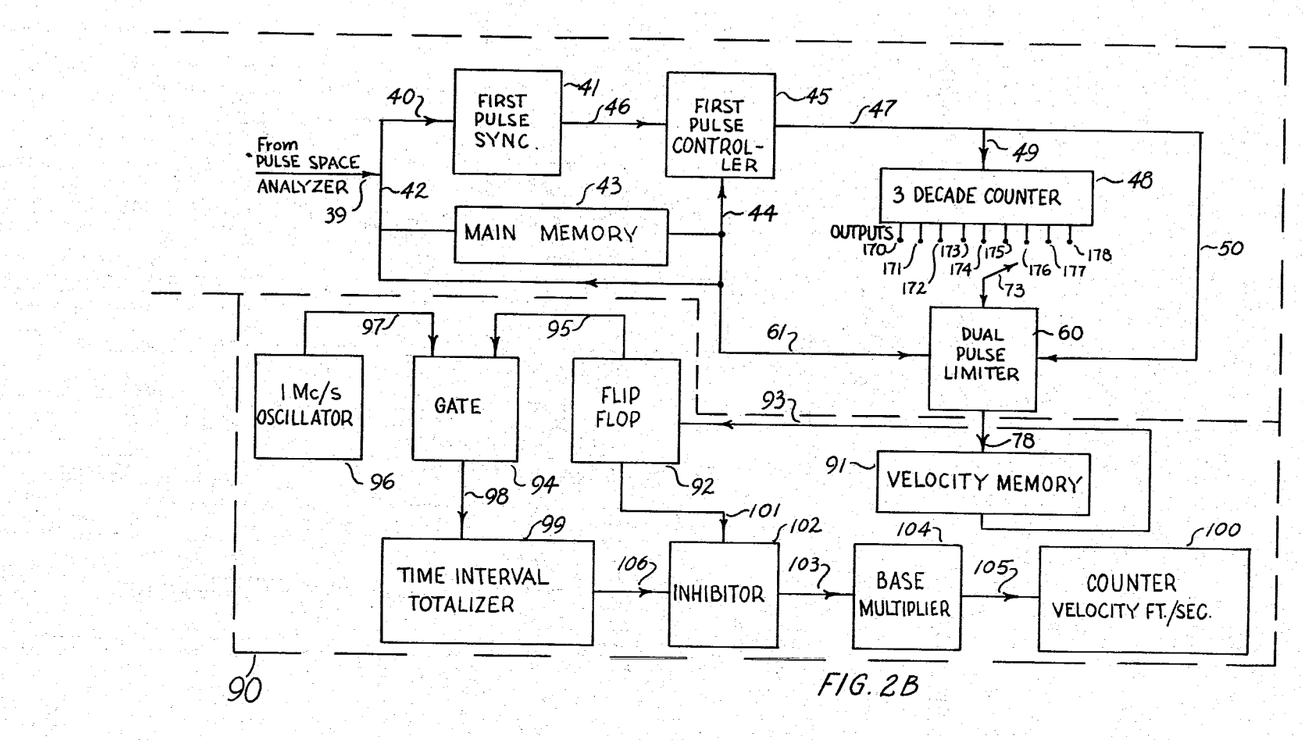

Each of the detector stations (not shown) is so designed as to detect the entry of a projectile into its particular area and to emit R.F. pulses at a frequency of 2.7 KMc/s. These pulses are generated by S band microwave transmitters provided at each detector station and are received by a projectile velocity automatic data processor unit as shown in FIG. 2 in a common receiving station. Each detector station emits R.F. pulses arranged in a particular combination so that two pulses are transmitted for each detection of a projectile. The first pulse is transmitted on activation of the detector station by a missile whilst the second is transmitted a predetermined time $t_1$ after the first pulse. The positioning in time of the second pulse thus constitutes a code. By using two such pulses having a predetermined spacing instead of a single pulse, the single-to-noise discriminating ability of the receiving system is normally better than if only single pulses are transmitted.

Referring to FIG. 2, a first R.F. pulse 21 is shown followed in time by a second R.F. pulse 22. The two pulses constitute a pair separated in time by a time interval $t_1$. The pulse pair 21 and 22 is transmitted by one of a plurality of projectile detector stations (not shown) in the system as a result of a projectile passing that station's position. When the projectile passes the position of the next succeeding projectile detector station, a second pair of pulses 23 and 24 is transmitted by that second detector station. Pairs of R.F. pulses are transmitted by succeeding detector stations as the projectile passes their respective positions, each pair of pulses being separated by a time interval $t_1$. The pulses are received by the S band horn antenna system 25 in the order in which the projectile passes the respective detector stations. Each detector station is, of course, provided with an S band microwave transmitter for the generation of R.F. pulses, for example, at a frequency of 2.7 KMc/s.

By designing the system to handle a pair of pulses, as described above, instead of only a single pulse, an improved signal-to-noise discrimination factor may be achieved. The pulses are fed from the S band antenna system along a path 26 to a mixer and first detector unit 27. In unit 27, the R.F. pulses are fed into an S band mixer stage which also receives signals from a local oscillator unit 28 along a connection 29. Intermediate frequency signals, comprising pulses at 30 Mc/s, are fed from stage 27 along connection 30 to an I.F. amplifier and second detector stage 31. The pulses are amplified by the I.F. amplifier, are then detected and the resulting video pulses are supplied along a connection 32 to a video amplifier stage 33. After amplification in the video amplifier stage 33, the pulse pairs are fed along a connection 34 to a "pulse analyzer unit 35." The input to the pulse space analyzer unit 35 corresponding to each pair of pulses such as 21 and 22 comprises a pair of well defined pulses such as 36 and 37 separated by the respective time interval $t_1$.

The function now of the pulse space analyzer unit 35 is to examine the received pulses such as 36 and 37 corresponding to pulses 21 and 22 to ensure that the received pulses are, in fact, from a detector station and are not noise spikes generated by some random interference. If the pulses 36 and 37 are of the correct spacing $t_1$, then single pulses, such as 38, are supplied at the output of the pulse space analyser for each pair of input pulses such as 36 and 37. The pulses 38 are supplied along connections 39 and 40 to the input of a first pulse synchronizer unit 41 which is a monostable flip-flop unit capable of providing a single output pulse corresponding to each trigger pulse 38. The trigger pulses 38 are also supplied along connection 42 to the input of a main memory unit 43 and it is arranged that the pulses supplied at the output of the first pulse synchronizer unit 41 have a pulse width which is approximately 30 microseconds less than the transit time of the main memory unit 43.

In operation when no projectile has been detected by the detector stations, then the first pulse synchronizer unit 41 is dormat and in a first stage. When the first detector station detects a projectile passing it, then a first pulse is generated by the pulse space analyzer unit 35 (FIG. 2) and this passes along line 39 to be stored in the main memory unit 43 and also to trigger the first pulse synchronizer unit 41. The first pulse synchronizer unit 41 produces an identification pulse synchronized with the first pulse received from the pulse space analyzer unit 35 in any pulse train corresponding to the passage of a projectile along a flight path of a plurality of projectile detector stations. The first pulse produced by unit 31 is utilized for later identification of the first pulse received by the projectile velocity automatic data processor system shown in FIG. 2.

As will be clear from FIG. 2, the pulses 38 succeeding the first pulse will also be supplied along connection 42 into the closed loop memory unit 43 where they are stored with their respective spacing and order of arrival preserved.

The pulses circulating in the memory unit 43 are non-destructively coupled along a connection 44 to the first pulse controller unit 45 which also receives an input along connection 46 from the output of the first pulse synchronizer unit 41. The first pulse controller unit 45 is command-operated by the pulse signal fed along connection 46 by the first pulse synchronizer unit 41. Since the pulse generated by the first pulse synchronizer unit 41 has a pulse width substantially equal to the transit time of memory unit 43, it is thus ensured that the first pulse synchronizer unit 41 is always only triggered by the first of a plurality of pulses that are stored in the memory unit 43. Thus a differentiator stage 70 (FIG. 3) in the first pulse controller unit 45 of FIG. 2 produces a positive pulse that is always synchronized to the first pulse stored in the main memory unit 43.

The command operation signal along connection 46 ensures that the first pulse appearing at the output of controller unit 45 on connection 47 corresponds in time to the first pulse which was received by the S band horn antenna system 25 and is now circulating in the memory. The construction of the first pulse controller unit 45 will be described in greater detail presently with reference to FIG. 3.

In FIG. 2, it will be seen that the output of the first pulse controller unit 45 on connection 47 is fed to a three decade counter unit over connection 49 and is also supplied along a connection 50 to a dual pulse limiter unit 60. The dual pulse limiter unit 60 is also supplied with an input along connection 61 from the closed loop memory unit 43.

Because the counter unit 48 is a three decade counter unit, it will be appreciated that the arrangement illustrated may handle information from up to one thousand projectile detector stations. If a greater number of detector stations is necessary, then it is quite simple to include further decade stages in counter 48. The first pulse count made by the counter unit 48 corresponds in time to the first pulse group received by the arrangement shown in FIG. 2.

The three decade counter 48 is adapted to supply output pulses to output terminals 170 to 178, each such count output terminal corresponding to the time arrival of a received signal by the S band horn antenna 25. By means of a command-operated three decade stepping switch 79, it is possible to select an output pulse from the counter unit 48 corresponding to any received signal at antenna 25 — the pulse which is passed to the output of switch 79 has, in fact, a numerical value that corresponds to its relative order of arrival at the S band horn antenna 25 and is obtained from that one of the terminals 170 to 178 having a corresponding numerical value to the received pulse signal. The count output pulse selected by swtich 79 is fed to the dual pulse limiter 60 as shown in FIG. 2. It will be appreciated that the selection of the pulse which is to be read out first from the three decade counter unit 48 is thus controlled by the command-operated three decade stepping switch 79 which successively switches count output terminals 170 to 178 of increasing numerical values.

It is to be appreciated that FIG. 2 is diagrammatic only and that some of the connections illustrated therein may be representative of several actual connections, all of which need not necessarily be from the same terminal or connected to the same stage within the respective unit shown in FIG. 2.

Figure 3:
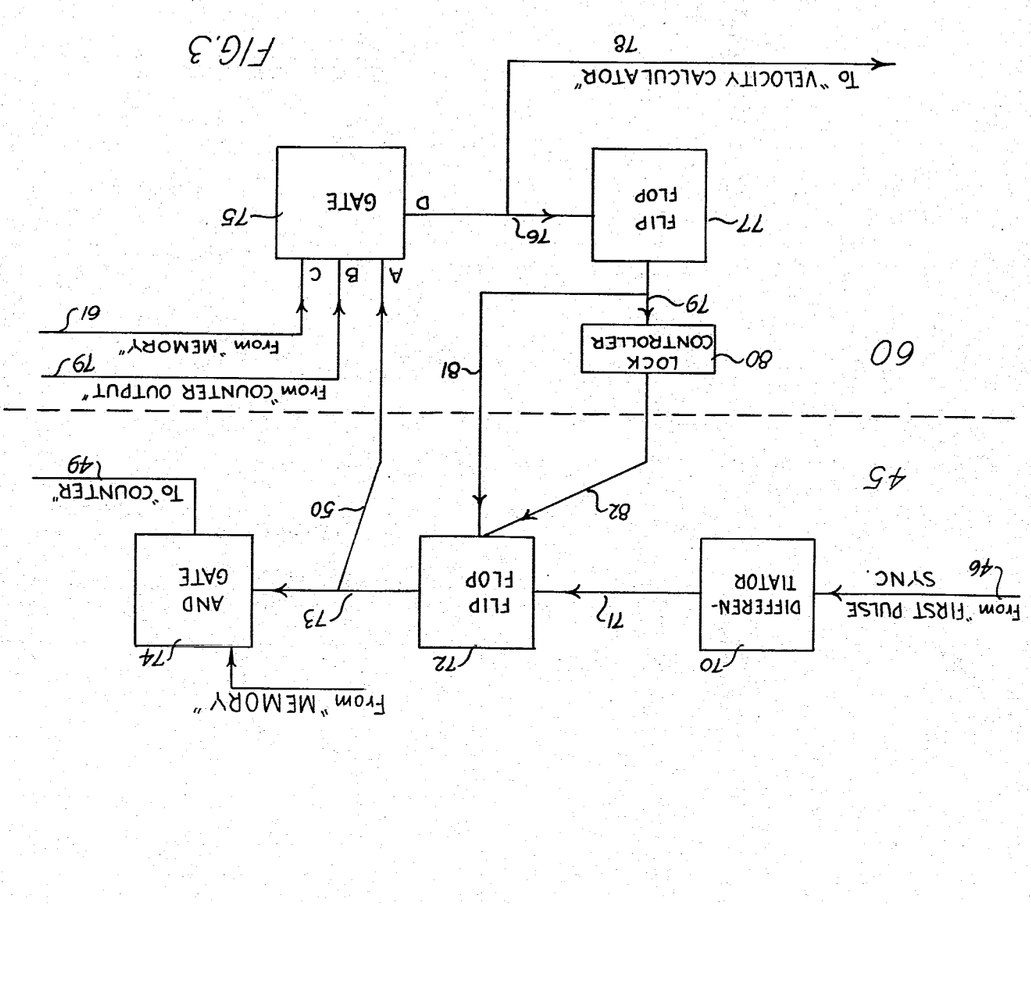
FIG. 3 is representation, in greater detail, of part of the system shown in FIG. 2.

In FIG. 3, the first pulse controller unit 45 and the dual pulse limiter unit 60 are shown in greater detail. The first pulse controller unit 45 includes a differentiator stage 70 to which is connected the input line 46 from the first pulse synchronizer unit 41 of FIG. 2. The output of the differentiator unit 70 is fed along connection 71 to a flip-flop stage 72 capable of supplying an output along connection 73 to an AND gate 74. The AND gate 74 supplies an output along connection 49 which is supplied to the three decade counter 48 in FIG. 2.

The dual pulse limiter unit 60 includes a gate 75 capable of supplying an output on connection 76 to a flip-flop stage 77 and also along connection 78 to the velocity calculator unit (FIG. 2). The flip-flop stage 77 is capable of supplying an output along connection 79 to a lock controller stage 80 and also an output along connection 81 to the flip-flop stage 72 within the first pulse controller 45. The lock controller stage 80 also supplies an output along connection 82 to the flip-flop stage 72 of the first pulse controller unit 45.

The output from the memory unit 43 along connection 61 to the dual pulse limiter unit 60 and the output from the three decade counter 48 along connection 79 to the dual pulse limiter unit 60 are both supplied to the gate 75 (FIG. 3). Gating stage 75 also receives an input from the flip-flop stage 72 along connection 50 (FIG. 2 and FIG. 3).

In use, when the three decade counter unit 48 (FIG. 2) is required to commence counting, the output of the first pulse synchronizer unit 41 is fed along connection 46 to the first pulse controller unit 45. That pulse is differentiated by the differentiator stage 70 and the positive pulse formed from the leading edge of the output of the first pulse synchronizer 41 is effective to trigger the flip-flop stage 72. In turn, the flip-flop stage 72 opens the AND gate 74 of the first pulse controller stage 45. Opening of the AND gate 74 permits the contents of the memory unit 43 to be fed to the three decade counter 48, the first pulse to enter the counter corresponding in time to the first signal pulse passed by pulse space analyzer 35 and now circulating in the main memory of the projectile velocity automatic data processor system.

Referring to FIG. 2, the pulse space analyzer unit 35 may well be of the type described in Canadian Patent 726,830 issued Jan. 25th, 1966 to William F. Slaght. Similarly, other units described in that patent may well be utilized, where suitable, in the present invention.

As explained above, a pulse having a numerical value corresponding to its order of arrival at the antenna 25 and selected by a stepping switch 79, via the position thereof corresponding to the count output terminal having the same numerical value as the pulse, is supplied to the dual pulse limiter unit 60 (FIG. 2). This unit is designed to accept and pass to a velocity calculator unit, that selected pulse from the counter unit 48 in addition to the first pulse which arrives from the memory 43 along connection 61 and immediately succeeding in time that pulse fed along connection 79. Those two pulses are passed to said velocity calculator whilst all succeeding pulses are blocked therefrom by the dual pulse limiter unit 60.

By way of example, consider that one wishes to measure the average velocity of a projectile travelling between the seventh and eighth detector stations. The selector switch 79 of FIG. 2 associated with the dual pulse limiter unit 60 is positioned at that one of the outputs 170 to 178 at which the seventh pulse into the three decade counter 48 will appear as the output. The dual pulse limiter unit 60 will ensure that only one pulse, synchronized to the seventh pulse circulating in the memory unit 43, will be passed to the velocity calculator. Thus, the output of the dual pulse limiter unit 60 comprises two pulses only having a time spacing equal to the time of flight of the projectile between the seventh and eighth detector stations.

The dual pulse limiter unit 60 is shown in greater detail in FIG. 3 and will be seen to consist of the above-mentioned gating stage 75, flip-flop stage 77 and lock controller stage 80 with their appropriate connections. For convenience, the operation of gate 75 will now be explained assuming that any voltage on line 50 is identified as "A," whilst a voltage on line 79 is identified by "B" and a voltage on line 61 is identified by "C." An active voltage from gate 75 on lines 76 and 78 is identified by "D."

a. If a pulse input is present on line 50 together with a pulse input on line 79, then an output from gate 75 is obtained as represented by the equation:

$$A + B = D.$$

b. If a pulse input is present on line 50 together with a pulse input on line 61, then no output is obtained from the gate 75 and this is represented by the equation:

$$A + C = O.$$

c. If a pulse input appears simultaneously on lines 50, 79 and 61, then this results in a pulse output from gate 75 represented by the equation:

$$A + B + C = D.$$

It is arranged that the operation (b) is necessary by way of an input C on line 61 and an input A on line 50 prior to the arrival of the first selected pulse on line 79 having a voltage B.

Gate 75 thus passes the selected pulse from counter 48 as received on line 79 and the corresponding output of gate 75 is arranged to trigger the bistable flip-flop stage 77 which thus provides a negative trigger voltage on line 81 which is connected to the input of bistable flip-flop unit 72. However, it is arranged that since this trigger voltage is negative, it has no effect on the flip-flop stage 72. Thus, gate 75 passes the selected pulse from counter 48 in addition to the next succeeding pulse from memory unit 43 The latter second pulse produces an output from the gate 75 and this output again triggers the flip-flop unit 77. That flip-flop is thus triggered for a second time and produces a positive trigger voltage at its output which is applied via line 81 to trigger the flip-flop stage 72 which turns off AND gate 74 and gate 75. Thus no more than two pulses are available as the output of gate 75 on line 78 to the velocity calculator.

The function of the lock controller unit 80 is such that it prevents further operation of flip-flop stage 72 by applying a clamping voltage thereto along line 82 so that it is clamped in the last position to which it was triggered, i.e., the position corresponding to the output of a positive trigger pulse voltage from the flip-flop stage 72. The operation of lock controller 80 therefore results in the removal of voltage from the input line 50 of gate 75 in the dual pulse limiter unit as well as the removal of voltage from the input of gate 74. Thus, as stated, only two pulses are passed to the velocity calculator by the dual pulse limiter stage 60.

When a second velocity read-out is required from the system, then the following sequence of operations must be initiated in the order below:

a. the velocity counter 100 (FIG. 2) must be reset to 0,
b. the memory unit 91 in the velocity calculator must be cleared,
c. the time totalizer unit 99 must be reset and cleared to zero, and
d. the lock controller unit 80 must then be reset so as to be ready for the next operation.

The resetting of the system is controlled by an automatic timer (not shown) which allows a new velocity read-out to be recorded on an electric typewriter approximately every four seconds.

Referring to FIG. 2, the velocity calculator unit 90 includes a closed loop memory stage 91 which is supplied with an input from the output of the dual pulse limiter stage 60. The signal pulse pair which is passed by the gate 75 along connection 78 (FIGS. 2 and 3) is stored by circulation in the memory stage 91, the time interval between the pulses being maintained. Each time a pulse completes one circuit of the memory stage 78, a trigger generator (now shown) in the memory stage 91 produces one pulse. In this way, pulse pairs having the same spacing as the circulating pulses in the memory stage and a PRF of 1/transit time of the memory stage 91, are available at the output of the memory stage. These pulse pairs at the memory output are fed to a bistable flip-flop stage 92 via a connection 93. The bistable flip-flop stage 92 generates a single pulse for every pulse pair it receives, that single pulse having a width equal to the spacing between the two pulse making up said pair. The pulses thus generated by the flip-flop stage 92 are fed to an AND gate stage 94 along a connection 95 together with the output from a crystal controlled 1 Mc/s oscillator stage 96 which supplies an output along connection 97. In this way, signal bursts of 1 Mc/s appear at the output of the gating stage 94 along connection 98. These 1 Mc/s bursts are supplied to the input of a time interval totalizer stage 99 which is essentially a preset counter set at a count of $1 \times 10^6$ and which is designed to totalize the time intervals. A time interval is, of course, the time spacing between two selected pulses and the time intervals are totalized until a totalized time of one second is obtained.

A second counter unit 100 is also provided identified as a velocity read-out (feet per second) unit. This is designed to count the number of times the bistable flip-flop stage 92 is activated. The counter unit 100 receives an indication every time flip-flop stage 92 is activated through a connection 101 to an inhibitor stage 102 which supplies a corresponding output along connection 103 via a base multiplier stage 104, and along a connection 105 to the input of counter unit 100. The total time of counting is greater than one second but the time interval totalizer unit 99, which has meanwhile been receiving pulses at 1 Mc/s along connection 98, determines when it has counted $10^6$ pulse and thus one second has elapsed during the complete operation of gate 94, and then emits a pulse along connection 106 to an input of the inhibitor stage 102, thereby inhibiting the input from connection 101 and preventing any further pulses being passed to the counter unit 100 and thus further counting by the velocity read-out counter is prevented. The velocity memory unit therefore has two pulses whose spacing apart is equal to the time of flight of the projectile between two adjacent detector stations. The first, or "zero-reference," pulse is selected by switch 79 on three decade counter 48 and the second pulse is that pulse which has been passed by the dual pulse limiter unit 60. The time these pulses circulate in the velocity memory unit exceeds one second. From these pulses a reading is obtained of the velocity of the projection in ft./sec. This is, of course, true only if the base length on which measurement is made is one foot. For the case in which projectile detector stations have a base length greater than one foot, the base multiplier unit 104 must be brought into play to multiply the count on the velocity read-out counter 100 by an amount equal to the base length measured in feet.

It will be appreciated that the distance between detector stations does not always exceed one foot. To measure the velocity of a projectile leaving a gun barrel, the detectors may well be less than one foot apart.

A velocity calculator system in accordance with the embodiment described above is excellent in certain applications. However, it has been found in practice that it is subject to certain limitations in that the time required for an operation can be longer than is sometimes desired. This is due to the fact that a velocity count is actually the number of times a pulse pair must circulate in the memory unit 91 (FIG. 2) in order to equal a preset number in the time interval totalizer unit 99. If the interval between pulses always equals the transit time of the memory, there would, of course, be less chance of the limitation referred to above. However, this is not always the case and as the time interval between the pulses becomes a smaller percentage of the transit time, the time taken to perform an operation increases. For example, with a line ten milliseconds long and containing two pulses with a 1 millisecond spacing, the time required to perform a velocity calculation on a one foot base would be preset count number/(pulse spacing × oscillator frequency) × transit time of memory or $100,000/(1 \times 10^{-3} \times 100,000) \times 10 \times 10^{-3}$ equals 10 seconds, as opposed to, for example, one second which would be required for the same calculation if the transit time of the memory were only one millisecond. Obviously, the shorter the transit time of the memory, the shorter the time taken to make a particular calculation. However, it will be appreciated, the transit time of the memory unit 91 must never be equal to or less than the pulse spacing with the system described above with reference to the first embodiment shown in FIG. 2 — it must, in fact, always exceed by at least $1 \times 10^{-6}$ seconds.

In a second embodiment of the invention, the above-mentioned disadvantage may be overcome and memories having delay times much shorter than pulse spacings may be used by incorporating several modifications as will now be described. The first pulse received by the S band horn antenna 25 of FIG. 2 should be injected into the memory unit for storage by circulation in a well-known manner. The counter should be adapted to count the number of time this first pulse must circulate in the memory before the second pulse arrives. The time interval between the two pulses is thus now the product of the delay time of the delay line and the count recorded in the counter unit plus, of course, the time interval between the two pulses stored in the memory unit. A "time reformer unit" preprogrammed by the counter unit should be provided whereby after the arrival of the second pulse, the output of the memory unit may be coupled to the time reformer unit. The output of the time reformer unit will then consist of a series of pulses equal in width to the product of the memory unit delay time and the stored count in the counter unit added to the time spacing between the two pulses stored in the memory unit and spaced in time by an amount equal to the delay time of the memory unit less the time between the two pulses stored. The output of the time reformer unit should then be connected to the input of the time interval totalizer unit 99 (FIG. 2) and the remaining units of the velocity calculator of FIG. 2 utilized in the same manner as described above with reference to FIG. 2.

A third embodiment of the present invention will now be described with reference to FIG. 2 in which parallel operation of a part of the system is utilized.

It will be appreciated that, in order that the main memory of the system shown in FIG. 2 may accept signals from detector stations located at intervals along the whole length of a two hundred foot missile range for minimum projectile velocities of one thousand feet per second, the transit time of the memory unit would have to be greater than 0.2 second. Similarly, for a one thousand foot missile range, the minimum acceptable transit time would be 1.0 second. The relationship between the memory unit's transit time and the range length and minimum expected projectile velocity, arises from the necessity to preserve both the order of arrival of the received pulses and the relative time spacing of the pulses received from the projectile detector stations. To accomplish this, it will be appreciated that the transit time of the memory unit must be greater than the time required for that projectile having the lowest velocity to travel between the first and last detector stations on the missile range.

Figure 4:
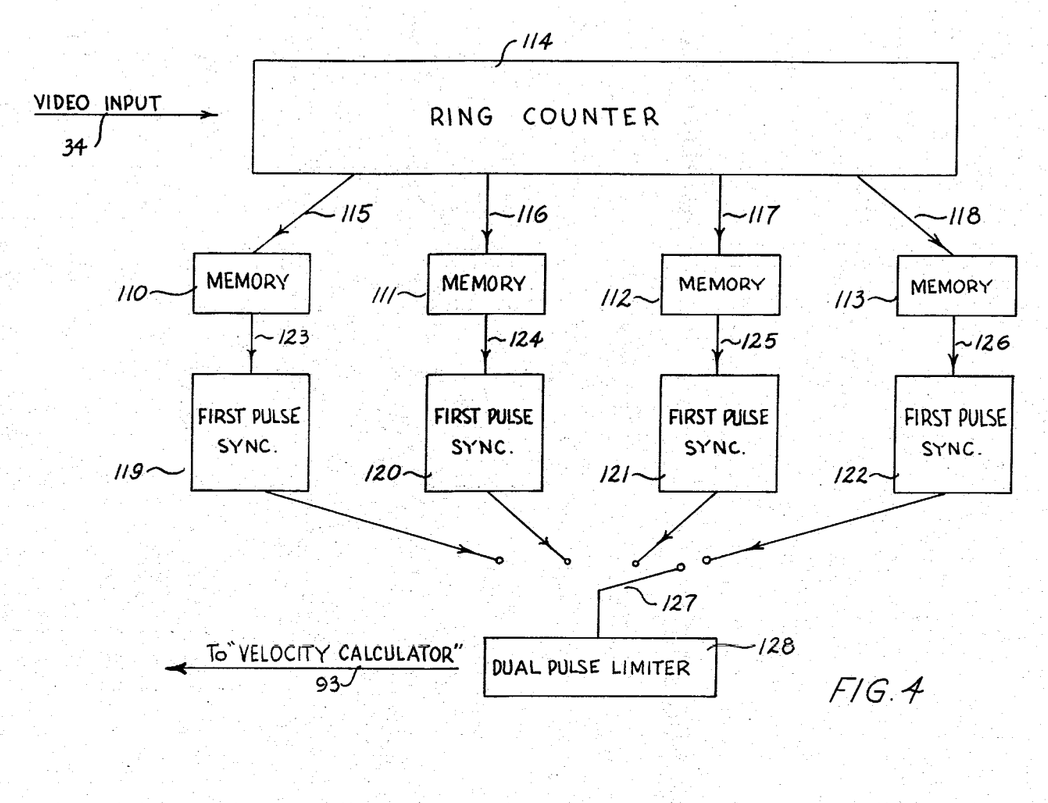
FIG. 4 is a diagrammatic representation of an alternative circuit which may be substituted for part of the circuit shown in FIG. 2 to constitute a further embodiment according to the present invention.

By operating the projectile velocity automatic data processor system in a parallel arrangement as shown in FIG. 4, the necessity for execptionally long memory unit transit times may be obviated or substantially reduced for a long missile range.

For parallel operation instead of the memory unit 43 (FIG. 2), a plurality of independent memory units 110, 111, 112, and 113 are provided as shown in FIG. 4. Each of these independent memory units is adapted to receive signals from two successive projectile detector stations from a ring counter unit 114 by respective connections 115, 116, 117, and 118. The ring counter unit 114 is supplied with input along connection 34 (FIG. 2) from the output of the video amplifier stage 33.

The operation of the system as modified in accordance with FIG. 4 will thus be as follows. A group of pulses will be received in the S band horn antenna 25 (FIG. 2), corresponding to pulses transmitted by a number of projectile detector stations and transmitted either over a common co-axial cable as video signals or over a common RF channel as RF pulses. These pass through the various units of the system shown in FIG. 2 to provide video signals on connection 34 at the output of the video amplifier 33. The video signals are supplied along connection 34 to the input of the ring counter 114 (FIG. 4) which distributes the pulses in pairs to the individual memory units 110 to 113, in the order of the arrival of those video pulses.

Respective first pulse synchronizer units 119, 120, 121, and 122 are connected to memory units 110 to 113 by way of connections 123, 124, 125, and 126. The respective first pulse synchronizer units 119 to 122 are adapted to sample the pulses stored in the respective memory unit 110 to 113 and to generate a positive pulse synchronized to the first pulse which is received by the respective memory unit. It should be mentioned that each first pulse synchronizer unit comprises a bistable flip-flop stage and a differentiating stage and the first pulse received by a respective memory unit 110 to 113, on being sampled, is effective to trigger the flip-flop in the respective one of the first pulse synchronizer units 119 to 122. The second pulse received by the respective memory unit is effective in the same way.

When a flip-flop stage in a first pulse synchronizer unit is triggered, the corresponding differentiating network is so arranged that the first positive pulse which it produces corresponds to the first pulse received by the memory unit whilst the second negative pulse produced by the differentiating network when the respective flip-flop is triggered for a second time corresponds in time to the second pulse received and stored by the respective memory unit. Therefore, the output of the first pulse synchronizer units 119 to 122 will always be comprised of a positive pulse corresponding to the first pulse received and having a PRF of 1/the transit time of the memory unit followed by a negative pulse corresponding in time to the second pulse which is received and is now circulating in the respective memory unit.

Synchronizing, i.e. identification, of the first pulse is essential in the system in order to preserve the true pulse spacing for further processing by the system. It will be appreciated that without it, further processing could be made with two pulses having a spacing equal to the transit time of the memory less the true time spacing of the two pulses circulating in the memory unit.

As will be seen from FIG. 4, a mechanical switch arrangement 127 is provided whereby a dual pulse limiter unit 128 may be connected in turn to the respective outputs of each of the first pulse synchronizer units 119 to 122. The dual pulse limiter unit 128 is utilized to generate a single pulse only when the respective triggering pulse, i.e. output of the corresponding differentiating circuit in the respective first pulse synchronizer unit is positive and also to generate a single pulse only when the triggering pulse, i.e. output of said differentiating circuit, is negative. The dual pulse limiter unit 128 is then rendered inoperative until it is again reset. The two pulses generated by the dual pulse limiter unit 128 are supplied along line 93 (FIG. 4 and FIG. 2) to the flip-flop stage 92 (FIG. 2) and operation of the system proceeds utilizing the remaining units illustrated in FIG. 2.

It will be seen from the above description that the arrangement illustrated in FIG. 4 is, in effect, capable of substitution for the units illustrated in FIG. 2 between the connections 34 and 93.

In one arrangement of a system which was established according to the instant invention, the characteristics of the system were as follows:

1. Video Input Signals
Type of Input                    Single line, multiplexed

| | |
|---|---|
| Signal Amplitude | detector stations<br>+6V to +150V max. |
| Pulse Width | 1.0 microsecond |
| Pulse rise time | less than 0.1 microsecond |
| 2. RF Input Signals | |
| Frequency Range | 2.7 to 3.2 K Mc/s |
| Required Accuracy | ± 1 Mc/s of selected center frequency |
| Minimum Input Signal | −75 dbM |
| Maximum Input Signal | +10 dbM |
| 3. Velocity calculator output | |
| Type of Output | 4 figures ft./sec. |
| Accuracy | ± 1 last figure |
| Time to perform one velocity calculation | 2 seconds minimum<br>4 seconds maximum |
| Max. time between calculations | 1.2 seconds |
| 4. Maximum Pulse Storage | 20,000 when using a 0.2 sec. memory |
| Resolution of Stored Pulses | ± 0.1 microsecond per 2 hr. period at +72° F. |
| Minimum Acceptable Spacing between Pulses | 5 microseconds |
| 5. Range Length Maximum | 200' per 1,000'/second projectile velocity when using 0.2 second memory |
| Maximum number of detector stations | 20,000 when using 0.2 second memory |

In the constructed system, the memory units which were used included sonic delay lines, video amplifiers and pulse shaper stages. Pulse storage was accomplished by injecting a pulse into the input of the respective delay line. After a predetermined delay time, this pulse was released from the line, amplified, reshaped abd injected back into the input of the delay line. Thus, any one pulse which was injected into the memory unit was preserved indefinitely and similarly when two pulses having a known time separation were injected into the memory unit, two pulses having a similar time separation circulated in the memory unit for an indefinite period of time. Those pulses were continually available by means of a non-destructive read-out arrangement for examination or for use in triggering further circuits. The memory units used were commercial units manufactured by Andersen Laboratories Inc., West Hartford, Connecticut and were, in fact, torsional mode wiresonic delay lines having a bit rate of 2 Mc/s NRZ (non-return zero).

It will be appreciated that instead of using a radio link between the respective transmitters and the receiver, the communication channel may constitute a co-axial line or cable extending from the receiver station to the nearest detector station and further co-axial lines extending between each pair of detector stations, thus providing a single co-axial cable channel from the receiver station through all the detector stations in series. Input connection may then be made directly to the ring counter unit 114 (FIG. 4). The described system may also be utilized to measure the spin rate of a projectile.

The embodiments of the invention in which an exclusive property or privilege is claimed are defined as follows:

1. A system for determining the relative velocities of a projectile at different portions of its flight path, including:
    a. a number of projectile detector stations located at predetermined intervals along said flight path and each capable of transmitting a signal on detection of a projectile;
    b. a common receiving station for receiving the signals transmitted by the detector stations;
    c. a common communication channel linking said detector stations to said common receiving station;
    d. said common receiving station having a memory storage capable of storing pulses corresponding to the received signals; and
    e. Calcuator means capable of analyzing adjacent pairs of said pulses and determining the relative velocities of each projectile when traveling over two or more of said predetermined intervals; wherein each detector station includes means to generate a pair of R.F. pulses in response to each passage of a projectile, said R.F. pulses having a predetermined spacing between them arranged so that any pair arriving at the common receiving station is received in full before any portion of a different pair of pulses arrives at the common receiving station, and the common receiving station includes means to identify the pulses by sensing the predetermined spacing between them before transmitting a signal to the memory storage.

2. A system according to claim 1 wherein:
    a. said common receiving station includes a pulse space analyzer unit for determining if each received pair has said predetermined spacing and for producing a single pulse corresponding to each of said pairs;
    b. said memory storage unit being capable of storing said single pulses; and
    c. the time interval between the pulses stored in said storage unit being indicative of the time interval between the corresponding signals received by the common receiving station.

3. A system according to claim 2 wherein:
    a. a first single pulse corresponding to the passage of a projectile past a first detector station is supplied to a first pulse synchronizing unit capable of emitting a first identification pulse synchronized therewith;
    b. said first identification pulse initiating a counting operation;
    c. said first sychronizing unit being capable of providing a second identification pulse corresponding to the next occurring single pulse and corresponding to the passage of the projectile past a second detector station; and
    d. said second identification pulse being operative to stop said counting operation to provide an indication of the velocity of the projectile between said first and second detector stations.

4. A system according to claim 3 wherein the first identification pulse initiates the operation of a time interval totalizer unit for totalizing the time intervals between oscillator pulses at a predetermined frequency supplied to it, said second identification pulse stopping operation of said totalizer whereby a counter velocity unit connected to said totalizer unit indicates the velocity of the projectile between said first and second detector stations.

5. A system according to claim 3 wherein the first identification pulse initiates the operation of a time interval totalizer unit for totalizing the time intervals between succeeding pairs of pulses supplied to it, until a totalized time of one second is reached, a counter velocity unit for counting the number of times pulses corresponding to the passage of a projectile past a detector station are provided at the output of said first pulse synchronizer unit, means for stopping said counting by said counter velocity unit when said time interval totalizer unit indicates said time of one second is reached whereby said counter velocity unit indicates the velocity of the projectile in units of distance per second.

6. A system according to claim 5 wherein a base multiplier unit is provided to multiply the reading said counter velocity unit by an amount equal to the predetermined interval between adjacent projectile detecting stations measured in said units of distance.

7. A system according to claim 2 including:
 a. the first of said single pulses being inserted into a memory unit for storage by circulation;
 b. a counter for counting the number of times said first single pulse circulates in said memory unit before the second single pulse arrives; and
 c. means for utilizing the product of the delay time of said memory unit and the count in said counter plus the time interval between the pulses stored in said memory unit to calculate the velocity of the projectile.

8. A system according to claim 2 wherein:
 a. said single pulses are supplied to a ring counter having a plurality of outputs;
 b. a separate memory unit in series with a first encoder unit being connected to each output of the ring counter; and
 c. a stepping switch for selecting the outputs of said first encoder units in turn and connected to a velocity calculator capable of calculating the velocity of a projectile.

9. A system according to claim 1 wherein each detector station includes an S band microwave transmitter to generate the pairs of R. F. pulses, and each receiving station includes an S band horn antenna to receive the pairs of R. F. pulses.

* * * * *